US008247326B2

(12) United States Patent
Balasubramaniam et al.

(10) Patent No.: US 8,247,326 B2
(45) Date of Patent: Aug. 21, 2012

(54) METHOD OF POLISHING NICKEL-PHOSPHOROUS

(75) Inventors: Venkataramanan Balasubramaniam, Singapore (SG); Ping-Ha Yeung, Singapore (SG)

(73) Assignee: Cabot Microelectronics Corporation, Aurora, IL (US)

( * ) Notice: Subject to any disclaimer, the term of this patent is extended or adjusted under 35 U.S.C. 154(b) by 607 days.

(21) Appl. No.: 12/170,954

(22) Filed: Jul. 10, 2008

(65) Prior Publication Data

US 2010/0009537 A1   Jan. 14, 2010

(51) Int. Cl.
*H01L 21/302* (2006.01)

(52) U.S. Cl. .................. 438/692; 438/693; 216/89
(58) Field of Classification Search .......... 438/692, 438/693; 216/89
See application file for complete search history.

(56) References Cited

U.S. PATENT DOCUMENTS

| 6,190,443 B1 | 2/2001 | Ohashi et al. |
| 6,332,831 B1 | 12/2001 | Shemo et al. |
| 6,447,563 B1 | 9/2002 | Mahulikar |
| 6,468,913 B1 | 10/2002 | Pasqualoni et al. |
| 6,749,488 B2 | 6/2004 | Pasqualoni et al. |
| 6,818,031 B2 | 11/2004 | Oshima |
| 6,910,952 B2 | 6/2005 | Suenaga et al. |
| 7,014,534 B2 | 3/2006 | Oshima et al. |
| 7,147,682 B2 | 12/2006 | Oshima et al. |
| 7,153,335 B2 | 12/2006 | Siddiqui et al. |
| 7,300,601 B2 | 11/2007 | Liu et al. |
| 2004/0159050 A1 | 8/2004 | Pasqualoni et al. |
| 2004/0232379 A1 * | 11/2004 | Ameen et al. ............ 252/186.1 |
| 2005/0079803 A1 | 4/2005 | Siddiqui et al. |
| 2005/0136807 A1 | 6/2005 | Kitayama et al. |
| 2006/0030155 A1 * | 2/2006 | Kim et al. ................ 438/691 |
| 2006/0046490 A1 | 3/2006 | Banerjee et al. |
| 2006/0096496 A1 * | 5/2006 | Sun et al. ................ 106/3 |
| 2006/0196850 A1 | 9/2006 | Roh et al. |
| 2006/0213868 A1 | 9/2006 | Siddiqui et al. |
| 2007/0207617 A1 | 9/2007 | Hey et al. |
| 2007/0209288 A1 | 9/2007 | Ohta et al. |
| 2007/0224101 A1 | 9/2007 | Ohta et al. |
| 2009/0127501 A1 * | 5/2009 | Kashima et al. .......... 252/79.5 |

FOREIGN PATENT DOCUMENTS

JP   2004-204152 A   7/2004

OTHER PUBLICATIONS http://www.westerhuis-restauratie.nl/pdf/chelating-agents.pdf , "Chelating Agents: their structure and properties"; 5 pages; No date.*
Korean Intellectual Property Office, International Search Report in International Patent Application No. PCT/US2009/003955 (Feb. 22, 2010).

* cited by examiner

*Primary Examiner* — Binh X Tran
(74) *Attorney, Agent, or Firm* — Thomas E. Omholt; Francis J. Koszyk; Steven D. Weseman

(57) ABSTRACT

The invention is directed to a method of chemically-mechanically polishing a surface of a substrate, comprising contacting a surface of a substrate comprising nickel-phosphorous with a chemical-mechanical polishing composition comprising wet-process silica, an agent that oxidizes nickel-phosphorous, and an aminopolycarboxylic acid, wherein the polishing composition has a pH of about 1 to about 5, and abrading at least a portion of the nickel-phosphorous to polish the substrate.

16 Claims, No Drawings

METHOD OF POLISHING NICKEL-PHOSPHOROUS

BACKGROUND OF THE INVENTION

The demand for increased storage capacity in memory or rigid disks and the trend towards miniaturization of memory or rigid disks (due to the requirement for smaller hard drives in computer equipment) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

As the demand for increased storage capacity has increased, so has the need for improved processes for the polishing of such memory or rigid disks. The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material. The planarity of the memory or rigid disks must be improved, as the distance between the recording head of a disk drive and the surface of the memory or rigid disk has decreased with improvements in recording density that demand a lower flying height of the magnetic head with respect to the memory or rigid disk. In order to permit a lower flying height of the magnetic head, improvements to the surface finish of the memory or rigid disk are required.

Surface roughness is a high frequency, short wavelength component of a measured surface which affects performance of memory disks insofar as it limits the decrease in the gap between the disk surface and the recording head of a disk drive that is practically achievable. Thus, reduction in surface roughness of memory disks is highly desirable from a performance standpoint. Attempts have been made to reduce surface roughness by utilizing abrasives having smaller particle size in polishing compositions for memory disks. However, typically smaller abrasive particles result in a reduction of removal rate of the surface of memory disks, which increases the amount of time required to achieve a desired surface finish, thereby increasing production time and costs. Accordingly, there is a need in the art for methods for polishing memory disks that produce decreased levels of surface roughness while exhibiting increased polishing rates.

BRIEF SUMMARY OF THE INVENTION

The invention provides a method of chemically-mechanically polishing a substrate, which method comprises (i) providing a substrate comprising nickel-phosphorous, (ii) contacting the substrate with a chemical-mechanical polishing composition comprising (a) wet-process silica, (b) an agent that oxidizes nickel-phosphorous, and (c) an aminopolycarboxylic acid, wherein the polishing composition has a pH of about 1 to about 5, and (iii) moving the polishing composition relative to the substrate to abrade at least a portion of the nickel-phosphorous to polish the substrate.

DETAILED DESCRIPTION OF THE INVENTION

The invention provides a method of chemically-mechanically polishing a substrate comprising nickel-phosphorous. The method comprises (i) providing a substrate comprising nickel-phosphorous, (ii) contacting the substrate with a chemical-mechanical polishing composition comprising, consisting essentially of, or consisting of (a) wet-process silica, (b) an agent that oxidizes nickel-phosphorous, and (c) an aminopolycarboxylic acid, wherein the polishing composition has a pH of about 1 to about 5, and (iii) moving the polishing composition relative to the substrate to abrade at least a portion of the nickel-phosphorous to polish the substrate.

The polishing composition comprises wet-process silica. Wet-process silica is characterized as being prepared by the polymerization of soluble silica precursors from aqueous solutions thereof. Wet-process silica comprises particles that typically are non-aggregated, individually discrete particles, which generally are spherical or nearly spherical in shape, but can have other shapes (e.g., shapes with generally elliptical, square, or rectangular cross-sections). Such particles typically are structurally different from fumed (i.e., pyrogenic) silica, which particles are prepared via flame hydrolysis of volatile precursors and have chain-like structures of aggregated primary particles.

Suitable examples of wet-process silica include condensation-polymerized silica and base-stabilized colloidal silica. Condensation-polymerized silica particles typically are prepared by condensing $Si(OH)_4$ to form substantially spherical particles. The precursor $Si(OH)_4$ can be obtained, for example, by hydrolysis of high purity alkoxysilanes, or by acidification of aqueous silicate solutions. Such condensation-polymerized silica particles can be prepared in accordance with U.S. Pat. No. 5,230,833 or can be obtained as any of various commercially available products such as the BINDZIL 50/80, 30/310, 40/130, and 40/170 products from EKA Chemicals, the Fuso PL-1, PL-2, PL-3, PL-3H, and PL-7 products, as well as other similar products available from DuPont, Bayer, Applied Research, and Clariant.

Base-stabilized colloidal silica particles can be prepared, for example, from silicic acid derived from an alkali silicate solution having a pH of about 9 to about 11, wherein the silicate anions undergo polymerization to produce discrete silica particles having the desired average particle size in the form of an aqueous dispersion. The colloidal silica is stabilized by the presence of a base such as sodium hydroxide. Non-limiting examples of commercially available colloidal silica suitable for use in the invention include SNOWTEX™ products from Nissan Chemical, NEXSIL™ and NEXSIL A™ series products available from Nyacol Nanotechnologies, Inc., the TX13112, TX11005, DVSTS006, 1034A, 1050, 1130, 2327, and 2329 products available from Nalco Chemical, and LEVASIL™ products available from H. C. Starck.

The wet-process silica abrasive particles typically have an average particle size (e.g., average particle diameter) of about 4 nm to about 200 nm. For example, the wet-process silica abrasive particles can have an average particle size of about 4 nm or more, about 10 nm or more, about 20 nm or more, about 30 nm or more, about 40 nm or more, or about 50 nm or more. In addition, or alternatively, the wet-process silica abrasive particles can have an average particle size of about 200 nm or less, about 150 nm or less, about 125 nm or less, about 110 nm or less, about 100 nm or less, about 80 nm or less, or about 50 nm or less. In some embodiments, the wet-process silica abrasive particles have an average particle size of about 4 nm to about 40 nm (e.g., about 8 nm to about 30 nm). In other embodiments, the wet-process silica abrasive particles have an average particle size of about 40 nm to about 90 nm (e.g., about 50 nm to about 80 nm). In still other embodiments, the wet-process silica particles have an average particle size of about 90 nm to about 200 nm (e.g., about 100 nm to about 150 nm). Generally, use of silica having smaller particle size results in lower surface roughness but at the expense of lower removal rate as compared with use of silica having larger particle size. In this regard, particle size refers to the diameter of the smallest sphere that encloses the particle.

The polishing composition typically comprises about 0.1 wt. % or more (e.g., about 0.2 wt. % or more, or about 0.5 wt. % or more) of wet-process silica. Preferably, the polishing composition comprises about 5 wt. % or less (e.g., about 4 wt. % or less, or about 3 wt. % or less) of wet-process silica. More preferably, the polishing composition comprises about 0.1 wt. % to about 5 wt. % (e.g., about 0.2 wt. % to about 4 wt. %, or about 0.5 wt. % to about 3 wt. %) of wet-process silica.

The silica desirably is suspended in the polishing composition, more specifically in the water of the polishing composition. When the silica is suspended in the polishing composition, the silica preferably is colloidally stable. The term colloid refers to the suspension of silica particles in the water. Colloidal stability refers to the maintenance of that suspension over time. In the context of this invention, a silica is considered colloidally stable if, when a suspension of the silica in water is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the silica composition ([C] in terms of g/ml) is less than or equal to 0.5 (i.e., $\{[B]-[T]\}/[C] \leq 0.5$). The value of $[B]-[T]/[C]$ desirably is less than or equal to 0.3, and preferably is less than or equal to 0.1.

The polishing composition comprises an agent that oxidizes nickel-phosphorous. The agent that oxidizes nickel-phosphorous can be any agent having a suitable oxidation potential at the pH of the polishing composition. Typically, the agent that oxidizes nickel-phosphorous is a peroxide. Non-limiting examples of suitable peroxides include hydrogen peroxide, alkyl hydroperoxides (e.g., t-butyl hydroperoxide), sodium peroxide, and the like. Preferably, the agent that oxidizes nickel-phosphorous is hydrogen peroxide.

The polishing composition typically comprises about 0.01 wt. % or more (e.g., about 0.05 wt. % or more, or about 0.1 wt. % or more) of the agent that oxidizes nickel-phosphorous. Preferably, the polishing composition comprises about 2 wt. % or less (e.g., about 1 wt. % or less, about 0.5 wt. % or less, about 0.4 wt. % or less, about 0.3 wt. % or less, or about 0.2 wt. % or less) of the agent that oxidizes nickel-phosphorous. More preferably, the polishing composition comprises about 0.01 wt. % to about 1 wt. % (e.g., about 0.05 wt. % to about 0.5 wt. %, or about 0.05 wt % to about 0.4 wt %) of the agent that oxidizes nickel-phosphorous.

The polishing composition comprises an aminopolycarboxylic acid. In the context of the invention, the term "aminopolycarboxylic acid" refers to a compound that comprises at least one amino functional group and two or more carboxylic acid functional groups. The amino functional group(s) can be primary amino group(s), secondary amino group(s) or tertiary amino functional group(s) but are preferably tertiary amino functional group(s). Preferably, the aminopolycarboxylic acid is selected from the group consisting of β-alaninediacetic acid, methylglycine diacetic acid, hydroxyethylethylenediaminetriacetic acid, diethylenetriaminepentaacetic acid, N,N,-bis(carboxymethyl)alanine, salts thereof, and combinations thereof. More preferably, the aminopolycarboxylic acid is methylglycinediacetic acid or hydroxyethylethylenediaminetriacetic acid.

It will be appreciated that the aforementioned aminopolycarboxylic acid can exist in the form of a salt, an acid, or a partial salt thereof. For example, an aminodicarboxylic acid includes aminodicarboxylic acid, as well as mono- and di-salts thereof. Furthermore, the aminopolycarboxylic acid can exist in the form of an acid salt of the amino functional group. Suitable carboxylate salts of the aminopolycarboxylic acid include, e.g, sodium salts, potassium salts, ammonium salts, tetraalkylammonium salts (e.g., tetramethylammonium salts), and the like. Suitable acid salts of the amino functional group(s) include hydrochloric acid salts, sulfuric acid salts, and the like.

The polishing composition typically comprises about 0.1 wt. % or more (e.g., about 0.2 wt. % or more, or about 0.5 wt. % or more) of the aminopolycarboxylic acid. Preferably, the polishing composition comprises about 5 wt. % or less (e.g., about 4 wt. % or less, or about 3 wt. % or less, or about 2 wt. % or less) of the aminopolycarboxylic acid. More preferably, the polishing composition comprises about 0.1 wt. % to about 5 wt. % (e.g., about 0.2 wt. % to about 4 wt. %, or about 0.5 wt. % to about 2 wt. %) of the aminopolycarboxylic acid.

Without wishing to be bound by any particular theory, it is believed that the aminopolycarboxylic acid acts as a complexing agent and serves to sequester nickel ions generated when the inventive method is used to polish substrates comprising nickel-phosphorous, thereby minimizing decomposition of the agent that oxidizes nickel-phosphorous that is catalyzed by free nickel ions.

Desirably, the polishing composition will have a pH of about 1 or more (e.g., about 2 or more). Preferably, the polishing composition will have a pH of about 5 or less (e.g., about 4 or less, or about 3 or less). More preferably, the polishing composition will have a pH of about 2 to about 4 (e.g., about 2 to about 3).

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be nitric acid, potassium hydroxide, or a combination thereof. The pH buffering agent can be any suitable buffering agent, for example, phosphates, sulfates, acetates, borates, ammonium salts, and the like. The polishing composition can comprise any suitable amount of a pH adjustor and/or a pH buffering agent, provided that a suitable amount of the buffering agent is used to achieve and/or maintain the pH of the polishing composition within the ranges set forth herein.

The polishing composition optionally further comprises a biocide. The biocide can be any suitable biocide, for example, an isothiazolinone biocide. The amount of biocide used in the polishing composition typically is about 1 ppm to about 500 ppm, and preferably is about 10 ppm to about 200 ppm.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., silica, agent that oxidizes nickel-phosphorous, aminopolycarboxylic acid, etc.) as well as any combination of ingredients (e.g., silica, agent that oxidizes nickel-phosphorous, aminopolycarboxylic acid, optional biocide, etc.).

For example, the silica can be dispersed in water. The aminopolycarboxylic acid and optional biocide can then be added, and mixed by any method that is capable of incorporating the components into the polishing composition. The agent that oxidizes nickel-phosphorous can be added at any time during the preparation of the polishing composition. The polishing composition can be prepared prior to use, with one or more components, such as the agent that oxidizes nickel-phosphorous, added to the polishing composition just before use (e.g., within about 1 minute before use, or within about 1 hour before use, or within about 7 days before use). The polishing composition also can be prepared by mixing the components at the surface of the substrate during the polishing operation.

The polishing composition can be supplied as a one-package system comprising silica, agent that oxidizes nickel-phosphorous, aminopolycarboxylic acid, optional biocide, and water. Alternatively, the silica can be supplied as a dispersion in water in a first container, and aminopolycarboxylic acid and optional biocide can be supplied in a second container, either in dry form, or as a solution or dispersion in water. The agent that oxidizes nickel-phosphorous desirably is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). The components in the first or second container can be in dry form while the components in the other container can be in the form of an aqueous dispersion. Moreover, it is suitable for the components in the first and second containers to have different pH values, or alternatively to have substantially similar, or even equal, pH values. Other two-container, or three or more-container, combinations of the components of the polishing composition are within the knowledge of one of ordinary skill in the art.

The polishing composition of the invention also can be provided as a concentrate which is intended to be diluted with an appropriate amount of water prior to use. In such an embodiment, the polishing composition concentrate can comprise the silica, aminopolycarboxylic acid, optional biocide, and water, with or without the agent that oxidizes nickel-phosphorous, in amounts such that, upon dilution of the concentrate with an appropriate amount of water, and the agent that oxidizes nickel-phosphorous if not already present in an appropriate amount, each component of the polishing composition will be present in the polishing composition in an amount within the appropriate range recited above for each component. For example, the silica, aminopolycarboxylic acid, and optional biocide can each be present in the concentration in an amount that is about 2 times (e.g., about 3 times, about 4 times, or about 5 times) greater than the concentration recited above for each component so that, when the concentrate is diluted with an equal volume of (e.g., 2 equal volumes of water, 3 equal volumes of water, or 4 equal volumes of water, respectively), along with the agent that oxidizes nickel-phosphorous in a suitable amount, each component will be present in the polishing composition in an amount within the ranges set forth above for each component. Furthermore, as will be understood by those of ordinary skill in the art, the concentrate can contain an appropriate fraction of the water present in the final polishing composition in order to ensure that other components are at least partially or fully dissolved in the concentrate.

The substrate to be polished using the method of the invention can be any suitable substrate that contains nickel-phosphorous. A preferred substrate comprises at least one layer comprising nickel-phosphorous. Particularly suitable substrates include, but are not limited to, memory or rigid disks, such as aluminum disks coated with nickel-phosphorous.

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. Nos. 5,196,353, 5,433,651, 5,609,511, 5,643,046, 5,658,183, 5,730,642, 5,838,447, 5,872,633, 5,893,796, 5,949,927, and 5,964,643. Desirably, the inspection or monitoring of the progress of the polishing process with respect to a workpiece being polished enables the determination of the polishing end-point, i.e., the determination of when to terminate the polishing process with respect to a particular workpiece.

The removal rate of a substrate can be determined using any suitable technique. Examples of suitable techniques for determining the removal rate of a substrate include weighing the substrate before and after use of the inventive polishing method to determine the amount of substrate removed per unit of polishing time, which can be correlated with the removal rate in terms of thickness of substrate removed per unit of polishing time, and determining the thickness of the substrate before and after use of the inventive polishing method to directly measure the removal rate of the substrate per unit of polishing time.

Measurement of surface roughness is well known in the art. Suitable techniques for the determination of surface roughness of a substrate include surface profilometry, light scattering techniques, interferometry, and atomic force microscopy. Instrumentation useful in determining surface roughness is commercially available from vendors including Schmitt Industries (Portland, Oreg.), Lightmachinery, Inc. (CA), and Veeco Instruments (Plainfield, N.Y.).

The following examples further illustrate the invention but, of course, should not be construed as in any way limiting its scope.

EXAMPLE 1

This example demonstrates the effect of the complexing agent on the removal rate observed for nickel-phosphorous achievable by the polishing method of the invention.

Similar substrates comprising nickel-phosphorous-coated aluminum disks were separately polished with fourteen different polishing compositions (Compositions 1A-1N). Each of Compositions 1A-1N contained 1.8 wt. % colloidal silica, glycine or methylglycinediacetic acid as a complexing agent, hydrogen peroxide, and water, at a pH of 2.35. Compositions 1A-1C contained 0.8 wt. % glycine, colloidal silica having an average particle size of 110 nm, and 0.10 wt. %, 0.20 wt. %, or 0.45 wt. % of hydrogen peroxide, respectively. Compositions 1D-1F contained 1.0 wt. % methylglycinediacetic acid, colloidal silica having an average particle size of 110 nm, and 0.10 wt. %, 0.20 wt. %, or 0.45 wt. % of hydrogen peroxide, respectively. Compositions 1G and 1H contained 0.8 wt. % glycine, colloidal silica having an average particle size of 70 nm, and 0.20 wt. % or 0.45 wt. % hydrogen peroxide, respectively. Compositions 1I and 1J contained 1.0 wt. % methylglycinediacetic acid, colloidal silica having an average particle size of 70 nm, and 0.20 wt. % or 0.45 wt. % hydrogen peroxide, respectively. Compositions 1K and 1L contained 0.8 wt. % glycine, colloidal silica having an average particle size of 23 nm, and 0.20 wt. % or 0.45 wt. % hydrogen peroxide, respectively. Compositions 1M and 1N contained 1.0 wt. % methylglycinediacetic acid, colloidal silica having an average particle size of 23 nm, and 0.20 wt. % or 0.45 wt. % hydrogen peroxide, respectively.

After polishing, the removal rate for nickel-phosphorous was determined for each composition. The results are set forth in Table 1.

TABLE 1

| Composition | Complexing Agent | Wt. % $H_2O_2$ | Ni—P Removal Rate (mg/min) |
| --- | --- | --- | --- |
| 1A (comparative) | Glycine | 0.10 | 6.04 |
| 1B (comparative) | Glycine | 0.20 | 7.21 |
| 1C (comparative) | Glycine | 0.45 | 7.42* |
| 1D (invention) | Methylglycinediacetic acid | 0.10 | 6.60 |
| 1E (invention) | Methylglycinediacetic acid | 0.20 | 8.55 |
| 1F (invention) | Methylglycinediacetic acid | 0.45 | 9.54 |
| 1G (comparative) | Glycine | 0.20 | 6.74 |
| 1H (comparative) | Glycine | 0.45 | 6.47* |
| 1I (invention) | Methylglycinediacetic acid | 0.20 | 7.48 |
| 1J (invention) | Methylglycinediacetic acid | 0.45 | 8.15 |
| 1K (comparative) | Glycine | 0.20 | 4.07 |
| 1L (comparative) | Glycine | 0.45 | 4.18* |
| 1M (invention) | Methylglycinediacetic acid | 0.20 | 6.07 |
| 1N (invention) | Methylglycinediacetic acid | 0.45 | 7.01 |

*average of two experiments

As is apparent from the results set forth in Table 1, Compositions 1D-1F, which contained methylglycinediacetic acid and colloidal silica having an average particle size of 110 nm, exhibited nickel-phosphorous removal rates that were approximately 9.3% to 29% greater than the nickel-phosphorous removal rates exhibited by Compositions 1A-1C, which contained glycine and colloidal silica having an average particle size of 110 nm, with the greatest difference (20%) exhibited between Compositions 1C and 1F, which contained 0.45 wt. % hydrogen peroxide. Compositions 1I and 1J, which contained methylglycinediacetic acid and colloidal silica having an average particle size of 70 nm, exhibited nickel-phosphorous removal rates that were approximately 11% and 26% greater, respectively, than the nickel-phosphorous removal rates exhibited by Compositions 1G and 1H, which contained glycine and colloidal silica having an average particle size of 70 nm. Compositions 1M and 1N, which contained methylglycinediacetic acid and colloidal silica having an average particle size of 23 nm, exhibited nickel-phosphorous removal rates that were approximately 49% and 68% greater, respectively, than the nickel-phosphorous removal rates exhibited by Compositions 1G and 1H, which contained glycine and colloidal silica having an average particle size of 23 nm.

EXAMPLE 2

This example demonstrates the effect of the complexing agent on the surface roughness observed for nickel-phosphorous resulting from use of the polishing method of the invention.

Similar substrates comprising nickel-phosphorous-coated aluminum disks were separately polished with the fourteen different polishing compositions recited in Example 1 (Compositions 1A-1N). After polishing, the average surface roughness ("$R_a$") of the substrates was determined using a light scattering texture measurement instrument obtained from Schmitt Industries (Portland, Oreg.), and the results are set forth in Table 2.

TABLE 2

| Composition | Complexing Agent | Wt. % $H_2O_2$ | $R_a$ (Å) |
| --- | --- | --- | --- |
| 1A (comparative) | Glycine | 0.10 | 0.62 |
| 1B (comparative) | Glycine | 0.20 | 0.69 |
| 1C (comparative) | Glycine | 0.45 | 0.71* |
| 1D (invention) | Methylglycinediacetic acid | 0.10 | 0.48 |
| 1E (invention) | Methylglycinediacetic acid | 0.20 | 0.58 |
| 1F (invention) | Methylglycinediacetic acid | 0.45 | 0.75 |
| 1G (comparative) | Glycine | 0.20 | 0.47 |
| 1H (comparative) | Glycine | 0.45 | 0.50 |
| 1I (invention) | Methylglycinediacetic acid | 0.20 | 0.43 |
| 1J (invention) | Methylglycinediacetic acid | 0.45 | 0.47 |
| 1K (comparative) | Glycine | 0.20 | 0.32 |
| 1L (comparative) | Glycine | 0.45 | 0.33* |
| 1M (invention) | Methylglycinediacetic acid | 0.20 | 0.32 |
| 1N (invention) | Methylglycinediacetic acid | 0.45 | 0.33 |

*average of two experiments

As is apparent from the results set forth in Table 2, the use of Compositions 1D and 1E, which contained methylglycinediacetic acid, colloidal silica having an average particle size of 110 nm, and 0.10 wt. % and 0.20 wt. % hydrogen peroxide, respectively, resulted in a surface roughness approximately 23% and 19% lower, respectively, than the surface roughness resulting from the use of Compositions 1A and 1B, which were identical to Compositions 1D and 1E except for containing 0.8 wt. % glycine instead of 1.0 wt. % methylglycinediacetic acid, when used to polish a substrate comprising nickel-phosphorous-coated aluminum. The use of Composition 1F, which contained methylglycinediacetic acid, colloidal silica having an average particle size of 110 nm, and 0.45 wt. % hydrogen peroxide, resulted in a surface roughness that was approximately 5.6% greater than the surface roughness resulting from the use of Composition 1C, which identical to Composition 1F except for containing 0.8 wt % glycine instead of 1.0 wt. % methylglycinediacetic acid. The use of Compositions 1I and 1J, which contained methylglycinediacetic acid, colloidal silica having an average particle size of 70 nm, and 0.20 wt. % and 0.45 wt % hydrogen peroxide, respectively, resulted in a surface roughness that was approximately 8.5% and 6% lower, respectively, than the surface roughness resulting from the use of Compositions 1G and 1H, which were identical to Compositions 1I and 1J except for containing 0.8 wt. % glycine instead of 1.0 wt. % methylglycinediacetic acid. The use of Compositions 1M and 1N, which contained methylglycinediacetic acid and colloidal silica having an average particle diameter of 23 nm, resulted in a surface roughness that was approximately equal to the surface roughness resulting from the use of Compositions 1K and 1L, which were identical to Compositions 1M and 1M, respectively, except for use of 0.8 wt. % glycine instead of 1.0 wt. % methylglycinediacetic acid.

EXAMPLE 3

This example demonstrates the effect of the complexing agent on the removal rate observed for nickel-phosphorous achievable by the polishing method of the invention.

Similar substrates comprising nickel-phosphorous-coated aluminum disks were separately polished with seven different polishing compositions (Compositions 3A-3G). Each of Compositions 3A-3G contained 1.8 wt. % colloidal silica having an average particle size of 70 nm and 0.45 wt % hydrogen peroxide in water at a pH of 2.35. Compositions 3A-3G further contained 0.8 wt. % glycine, 2.0 wt. % glycolic acid, 0.8 wt. % citric acid, 0.8 wt. % tartaric acid, 0.8 wt. % alanine, 0.8 wt. % hydroxyethylethylenediaminetriacetic acid, and 0.8 wt. % methylglycinediacetic acid, respectively.

After polishing, the removal rate for nickel-phosphorous was determined, and the results are set forth in Table 3.

TABLE 3

| Composition | Complexing Agent | Ni—P Removal Rate (mg/min) |
|---|---|---|
| 3A (comparative) | Glycine | 7.0* |
| 3B (comparative) | Glycolic acid | 7.4 |
| 3C (comparative) | Citric acid | 6.8 |
| 3D (comparative) | Tartaric acid | 6.3 |
| 3E (comparative) | Alanine | 6.8 |
| 3F (invention) | Hydroxyethylethylenediaminetriacetic acid | 7.7 |
| 3G (invention) | Methylglycinediacetic acid | 8.6 |

*average of two experiments

As is apparent from the results set forth in Table 3, Composition 3F, which contained hydroxyethylethylenediaminetriacetic acid, exhibited a nickel-phosphorous removal rate that was approximately 4.1% to 22% greater than the removal rate exhibited by Compositions 3A-3D. Composition 3G, which contained methylglycinediacetic acid, exhibited a nickel-phosphorous removal rate that was approximately 16% to 37% greater than the removal rate exhibited by Compositions 3A-3D.

EXAMPLE 4

This example demonstrates the effect of the complexing agent on the surface roughness observed for nickel-phosphorous resulting from use of the polishing method of the invention.

Similar substrates comprising nickel-phosphorous-coated aluminum disks were separately polished with five different polishing compositions (Compositions 4A-4E). Each of the polishing compositions contained 1.8 wt. % colloidal silica having an average particle size of 70 nm and 0.45 wt. % hydrogen peroxide in water at a pH of 2.35. Compositions 4A-4E further contained 0.8 wt. % glycine, 1.8 wt. % glycolic acid, 3.0 wt. % glycolic acid, 1.0 wt. % hydroxyethylethylenediaminetriacetic acid, and 1.0 wt. % methylglycinediacetic acid, respectively.

After polishing, the average surface roughness ("$R_a$") of the substrates was determined using a texture measurement instrument obtained from Schmitt Industries (Portland, Oreg.), and the results are set forth in Table 2.

TABLE 4

| Composition | Complexing Agent | $R_a$ (Å) |
|---|---|---|
| 4A | Glycine | 0.51* |
| 4B | Glycolic acid (1.8 wt. %) | 0.56 |
| 4C | Glycolic acid (3.0 wt. %) | 0.53 |
| 4D | Hydroxyethylethylenediaminetriacetic acid | 0.45 |
| 4E | Methylglycinediacetic acid | 0.46 |

*average of three experiments

As is apparent from the results set forth in Table 4, use of Composition 4D, which contained hydroxyethylenediaminetriacetic acid, resulted in a surface roughness approximately 12% to 20% lower than the surface roughness resulting from the use of Compositions 4A-4C, when used to polish a substrate comprising nickel-phosphorous-coated aluminum. The use of Composition 4E, which contained methylglycinediacetic acid, resulted in a surface roughness approximately 9.8% to 18% lower than the surface roughness resulting from the use of Compositions 4A-4C, when used to polish a substrate comprising nickel-phosphorous-coated aluminum.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of chemically-mechanically polishing a substrate, which method comprises:
   (i) providing a substrate that is a nickel-phosphorous-coated disk,
   (ii) contacting the substrate with a chemical-mechanical polishing composition comprising:
      (a) wet-process silica,
      (b) hydrogen peroxide, and
      (c) an aminopolycarboxylic acid, wherein the aminopolycarboxylic acid is selected from the group consisting of methylglycine diacetic acid, hydroxyethylethylenediaminetriacetic acid, salts thereof, and combinations thereof,
         wherein the polishing composition has a pH of about 1 to about 5, and
   (iii) moving the polishing composition relative to the substrate to abrade at least a portion of the nickel-phosphorous to polish the substrate.

2. The method of claim 1, wherein the wet-process silica has an average particle size of about 20 nm to about 125 nm.

3. The method of claim 1, wherein the polishing composition comprises about 0.05 to about 0.5 wt. % hydrogen peroxide.

4. The method of claim 1, wherein the aminopolycarboxylic acid is methylglycinediacetic acid.

5. The method of claim 1, wherein the aminopolycarboxylic acid is hydroxyethylethylenediaminetriacetic acid.

6. The method of claim 1, wherein the pH of the polishing composition is about 2 to about 4.

7. The method of claim 1, wherein the pH of the polishing composition is about 2 to about 3.

8. The method of claim 1, wherein the polishing composition comprises about 0.1 wt. % to about 5 wt. % wet-process silica.

9. The method of claim 2, wherein the polishing composition comprises about 0.5 wt. % to about 3 wt. % wet-process silica.

10. The method of claim 1, wherein the polishing composition comprises about 0.1 wt. % to about 5 wt. % of the aminopolycarboxylic acid.

11. The method of claim 10, wherein the polishing composition comprises about 0.5 wt. % to about 2 wt. % of the aminopolycarboxylic acid.

12. The method of claim 1, wherein the substrate is a nickel-phosphorous-coated aluminum disk.

13. The method of claim 12, wherein the disk is a memory disk.

14. The method of claim 1, wherein the polishing composition comprises:
   (a) about 0.1 wt. % to about 5 wt. % condensation-polymerized silica,
   (b) about 0.05 wt. % to about 0.5 wt. % hydrogen peroxide, and
   (c) about 0.1 wt. % to about 5 wt. % of methylglycine diacetic acid or hydroxyethylethylenediaminetriacetic acid,
wherein the polishing composition has a pH of about 2 to about 4.

15. The method of claim 14, wherein the substrate is a nickel-phosphorous-coated aluminum disk.

16. The method of claim 15, wherein the disk is a memory disk.

* * * * *